3,386,439
DENTAL IRRIGATOR
Thomas P. Harper, Alexandria, Va.
(7512 Murillo St., Springfield, Va. 22151)
Filed Oct. 19, 1965, Ser. No. 498,060
3 Claims. (Cl. 128—229)

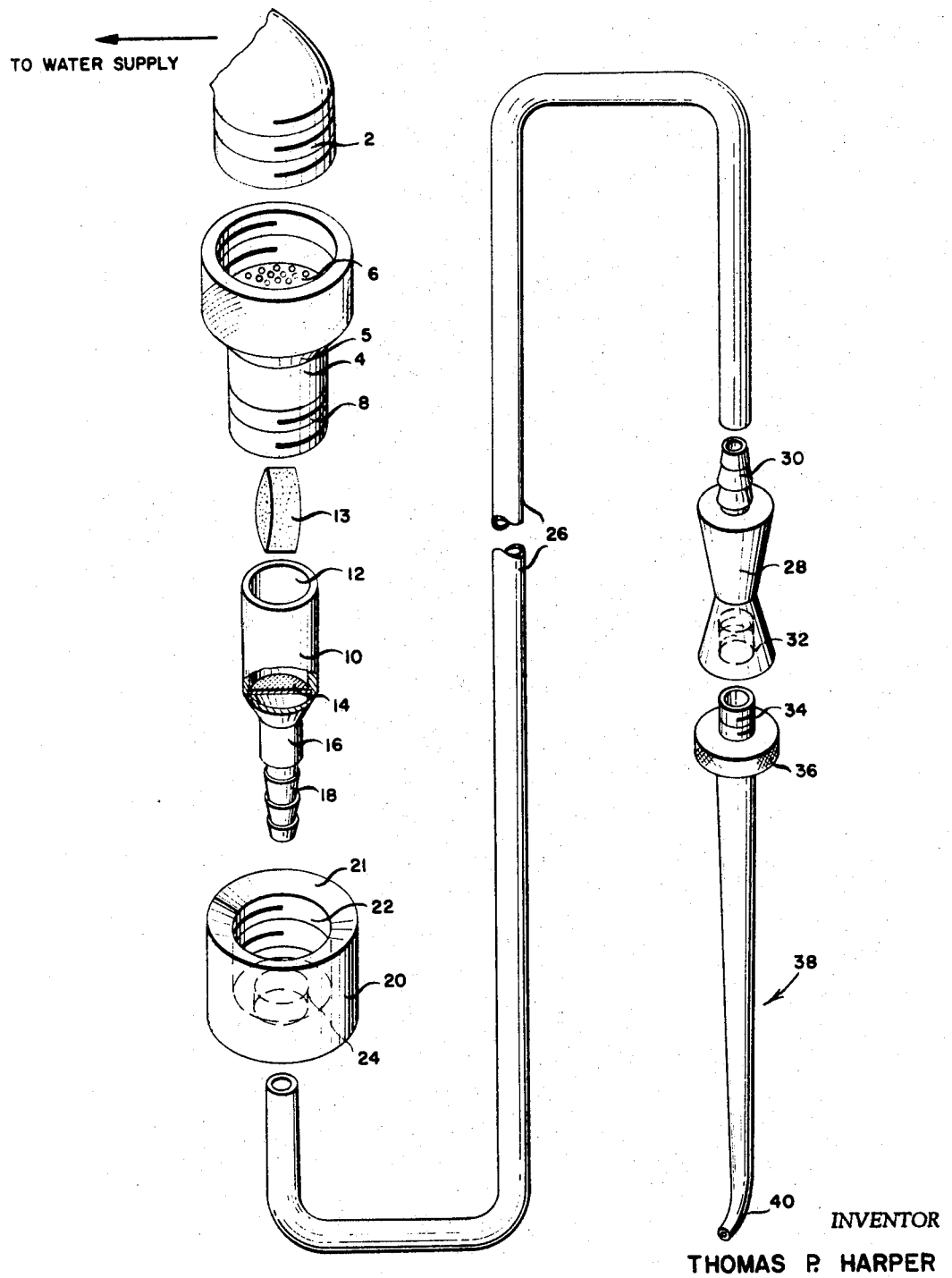

ABSTRACT OF THE DISCLOSURE

A dental irrigator including an adapter for attaching one thereof to a standard faucet, a liquid treatment chamber adjacent to said adapter and maintained in place by a removable cap. An interconnecting passage in the treatment chamber connects the outlet of the adapter to hose which terminates in a nozzle. A screen is also provided in the treatment chamber so that only the dissolved portion of a pellet may pass therethrough.

This invention relates generally to dental irrigators and more particularly to a dental irrigator wherein the irrigating liquid is admixed prior to application. Devices of this general type are adapted to clean teeth and to dislodge particles from the interspaces between the teeth as well as microcosmic ecosystems more commonly known as "plaque" by means of a fine stream or jet of water.

Accordingly, it is an object of the present invention to provide a dental irrigator with a liquid treatment chamber wherein the liquid directed to the teeth or interspaces between them may be sweetened as in a mouth rinse.

Another object of the present invention is to fill the liquid treatment chamber of a dental irrigator with a substance which will purify the liquid and in turn treat the teeth with a septic or germ destroying rinse or wash.

A further object of the present invention is to provide a dental irrigator with a liquid treatment chamber having an easily removable nozzle to facilitate simple sterilization as well as provide for the use of several nozzles.

Still another object of the present invention is to provide a dental irrigator having a liquid treatment chamber which may be simply attached to the basin faucet in the average home.

Another object of the present invention is to provide a dental irrigator having a liquid treatment chamber with a minimum of parts for most economical manufacture.

These and other objects of the invention will become apparent from the description when taken in conjunction with the drawing wherein:

The figure is an exploded perspective view partially in section.

Turning now more specifically to the drawing, there are shown the spigot end of a faucet provided with external threads 2 to which an adapter 4, preferably molded of plastic, having an aerator 6 may be easily secured. While this faucet is shown with external threads on the spigot end 2 onto which the adapter 4 is threaded, obviously, if the spigot end 2 has internal threads, the adapter 4 may be designed to cooperate with these threads. Aerator 6 is normal in construction comprising a pattern of holes through a disc parallel to the flow of water from the faucet. The lower portion of the adapter 4, threaded as at 8, is smaller in diameter than the upper portion while the surface 5 between the two portions is truncated to fit tightly against surface 21 of cap 20 hereinafter described.

The second element of the dental irrigator, broadly indicated at 10, contains the liquid treatment chamber. The external diameter of the upper portion of this element is slightly less than the lower internal portion of the adapter 4 into which it is slidably fed. Within the upper portion is a recess 12, the liquid treatment chamber, suitable to receive a pill or tablet 13, having a fine mesh screen 14, shown in section, at its bottom. The purpose of screen 14 will be discussed later on in the specification. Element 10 narrows as at 16 and terminates in a ridged tapered member 18 over which hose 26 is pressed.

A third element is cap 20 which holds the second element having the liquid treatment chamber within the lower portion of adapter 4. As previously mentioned, cap 20 is internally threaded as at 22 for cooperation with threads 8 and inwardly tapered at its top 21 for liquid sealing engagement with surface 5. It is apparent that hose connecting member 18 projects through hole 24 in the bottom of cap 20.

The elements described heretofore comprise the adapter with its aerator, the liquid treatment chamber member, and screen and the cap which holds them together. Between these elements and the dental irrigator press is a plastic or rubber hose 26, approximately two feet in length. A double truncated handle 28 is provided with a nipple 30 over which one end of hose 26 is pressed while it is recessed and internally threaded at 32 to receive a mating threaded portion 34 of the irrigator nozzle 38. A knurled knob 36 facilitates this mating. Nozzle 38 terminates in a curved tip 40 to simplify positioning for operation.

The concept of dental irrigation is hardly novel with the presentation of this device, although the refinement of adding a liquid treatment chamber greatly enhances its utilization. Prior irrigators offered complex valve arrangements consisting of many moving elements all of which are subject to wear and prone to break down. The present invention discloses a simple device, preferably formed of molded plastic, for irrigating the interspaces of teeth and means to treat the liquid from a common faucet with any number of compounds. The pill, generally indicated at 13, may be a refreshing mouth wash when dissolved in the recess 12 or a germicidal antiseptic capable of pleasantly retarding infection. The fine mesh screen 14 prevents segments of the pill 13 from reaching the area of treatment before it is completely admixed with the water.

It is within this concept that the nozzle 38 portions of this dental irrigator may be readily removed and individually kept. Therefore, it follows that in a family, each member may have his or her own nozzle for sanitary purposes. Secondly, depending on its composition and susceptibility to liquid, pills must be replaced when completely disintegrated, which involves separation of cap 20 from adapter 4 and insertion of the new pill in recess 20.

It is to be understood that modifications and substitutions can be made in the present invention without departing from the scope of the invention.

I claim:
1. A dental irrigator for attachment to a water faucet outlet comprising
   adapter means for attachment to said faucet at one end thereof,
   a liquid treatment chamber, a screen within said liquid treatment chamber, a cap receiving said liquid treatment chamber therewithin, means removably securing one end of said cap to the other end of said adapter, a rigid conduit extending from said liquid treatment chamber through the other end of said cap, a flexible conduit secured at one end thereof to said rigid conduit, a handle having a passage therethrough connected at one end thereof to the other end of said flexible conduit, and an irrigator nozzle removably secured to the other end of said handle and communicating with said handle passage.

2. The dental irrigator of claim 1 further comprising an aerator secured within said adapter.

3. The dental irrigator of claim 2 wherein said liquid treatment chamber contains an enlarged recess above said screen adapted to receive a solid medicated pellet.

References Cited

UNITED STATES PATENTS

| | | | |
|---|---|---|---|
| 778,491 | 12/1904 | Hull | 285—8 |
| 2,208,031 | 7/1940 | Hooper | 128—229 |
| 2,219,813 | 10/1940 | Hooper | 285—8 |
| 2,587,784 | 3/1952 | Story | 128—229 |
| 2,855,930 | 10/1958 | Blankfield | 128—229 |
| 3,227,380 | 1/1966 | Pinkston | 128—229 XR |

RICHARD A. GAUDET, *Primary Examiner.*

R. L. FRINKS, *Examiner.*